April 17, 1934.  S. G. NUCCIO  1,955,649
LIFTING JACK
Filed Sept. 19, 1933
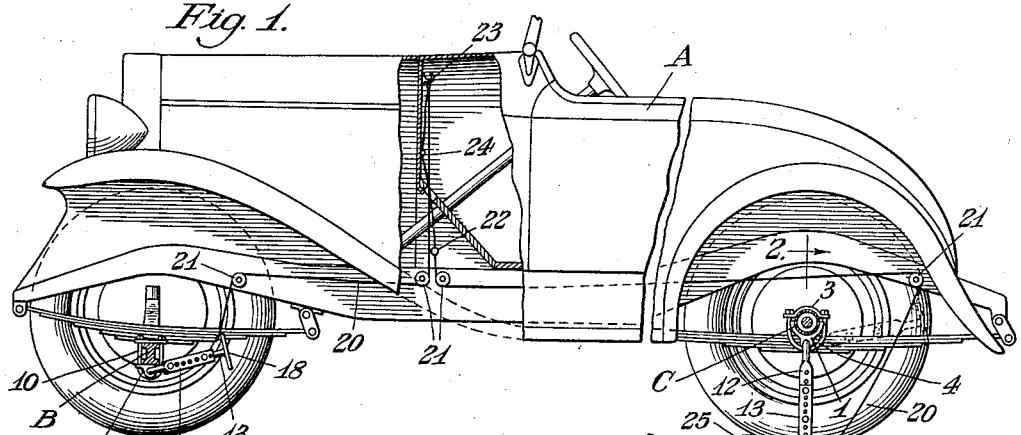
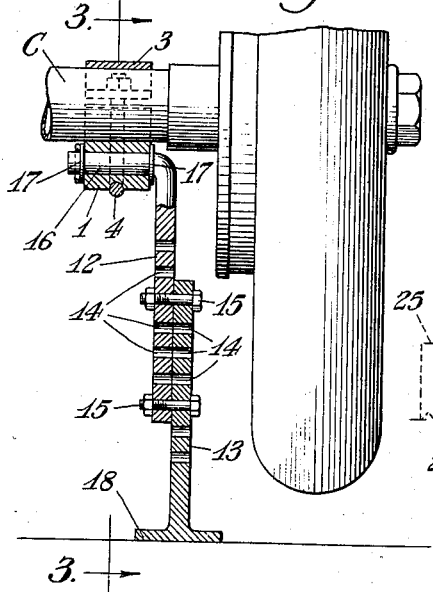
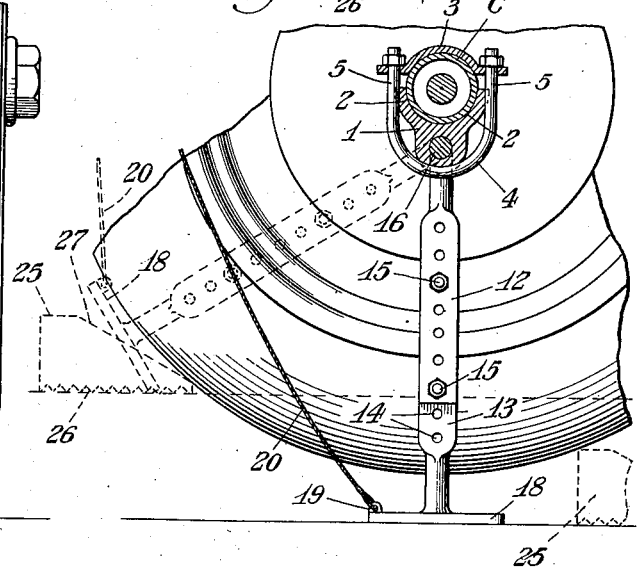
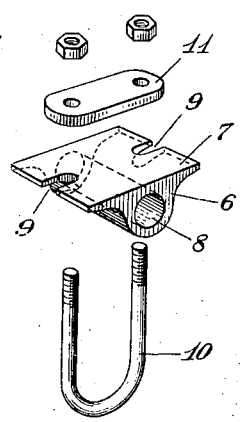
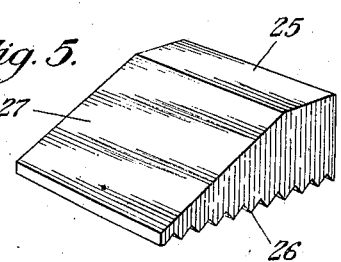
Salvatore G. Nuccio.
INVENTOR
BY Victor J. Evans & Co.
HIS ATTORNEYS Patented Apr. 17, 1934

1,955,649

UNITED STATES PATENT OFFICE 1,955,649

LIFTING JACK

Salvatore G. Nuccio, Chicago, Ill.

Application September 19, 1933, Serial No. 690,144

3 Claims. (Cl. 254—86)

This invention relates to lifting jacks, and its general object is to provide a jack that is primarily designed for use with and carried by a motor vehicle, wherein the power derived from the propelling means of the vehicle, to which the jack is attached, is utilized in disposing the latter in operative or supporting position, to elevate a wheel of the vehicle, when it becomes necessary to change a tire or to perform other work with respect thereto.

Another object of the invention is to provide an elevating device for vehicle wheels, that includes a jack for each wheel with chock means co-operating with the jack and the power of the propelling means, in elevating any one of the wheels.

A further object of the invention is to provide an elevating device including a jack for each wheel of the vehicle, and which is carried by the vehicle in a normal raised position, but is capable of being lowered for use from the driver's seat thereof.

A still further object of the invention is to provide a device of the character set forth that is reasonably simple in construction, easy to operate, inexpensive to manufacture, and extremely efficient in operation and service.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Fig. 1 is a view of a motor vehicle partly in section, showing my device associated therewith and the application of the jacks to both the front and rear axles thereof;

Fig. 2 is a sectional view taken approximately on line 2—2 of Fig. 1, looking in the direction of the arrows;

Fig. 3 is a sectional view taken approximately on line 3—3 of Fig. 2, and indicates in dotted and full lines the positions assumed by my jack, as well as the chock, when elevating a wheel;

Fig. 4 is a perspective view illustrating the parts of the hanger for applying my jack to the front axle of the vehicle; and Fig. 5 is a similar view of the chock for the wheel and which is used in disposing the jack in operative or supporting position.

Referring to the drawing in detail, the letter A indicates a motor vehicle, B the front axle thereof, and C the rear axle housing. While I have illustrated my jack applied to the front axle and the rear axle housing, adjacent the wheels as shown, it will, of course, be understood that a jack is disposed adjacent each of the four wheels of the vehicle.

The foregoing structure is identical for each wheel, but the hangers for the jacks vary in structure due to the cross-section configuration of the front axle and the rear axle housing, as will be noted as clearly shown in Fig. 1. The hangers for the jacks for the rear wheels each include a body 1 that is provided with a concavity in its upper surface shaped to follow the curvature of the housing in order to provide arm portions 2 disposed upon opposite sides of the housing as clearly shown in Fig. 3.

Extending transversely through the body 1 is a bore for a purpose which will be presently described and co-operating with the arm portions is a plate 3 that is curved intermediate its ends to follow the curvature of the upper portion of the housing, and upon opposite sides of the curved portion of the plate 3 are openings to receive the upper ends of a U-bolt 4. The bight portion of the U-bolt 4 is received in a recess in the lower end of the body 1, and the arms, which for distinction are indicated by the reference numerals 5, are received in depressions in the portions 2, as shown in Fig. 3. The U-bolt, together with the nuts thereof, acts as the means for clamping the hanger to the rear axle housing in the manner as clearly shown in Fig. 3.

The front axle hanger is slightly different as above indicated and includes a body 6 having a flat upper surface 7 and the body 6 is provided with a bore 8 extending transversely thereof as clearly shown in Fig. 4. Extending through the flat upper surface and into the sides of the body 6 are recesses 9 disposed in diametrically opposed relation with respect to each other for the purpose of receiving the arms of U-bolt 10. The flat upper surface 7 is adapted to be disposed against the lower surface of the front axle B and co-operating with the body 6 is a plate 11 that is provided with openings to receive the arms of the U-bolt as clearly shown in Fig. 1. The plate 11 is disposed upon the upper surface of the axle, and the nuts of the U-bolt co-operate therewith for securing the body 6 and the plate 7 in clamping engagement with the front wheel.

Each of the jackets includes adjustably associated parts or sections, which are provided with relatively flat portions 12 and 13 respectively, the flat portion 12 being for the upper section, while the flat portion 13 is for the lower section. These flat portions have each arranged therein a plurality of openings 14, so that any one of the openings of the flat portions can be disposed in registration to receive bolt and nut connections 15 for securing the respective sections in adjusted positions with respect to each other as clearly shown in Fig. 2. The upper section is reduced beyond its flat portion 12, and the reduced portion is round in cross-section and bent at right angles upon itself to provide a stud 16 that is mounted for rotation in the bore of the bodies of either of the front or rear hangers, so that the jacks can be moved to either a normal raised position or an operative lowered position as clearly shown in Fig. 1. The stud is held in the bore through the instrumentality of a cotter pin as shown and washers 17 are disposed upon opposite sides of the bodies.

The lower section of the jack is likewise reduced below the flat portion 13 thereof and formed with the reduced portion is a base 18 which acts as a ground engaging means as will be apparent, and the base has formed therewith or otherwise secured thereto an apertured ear 19 for the purpose of having fixed thereto one of the ends of a flexible element such as a cable 20. The cable is trained about pulleys 21 which are journaled to the frame of the vehicle as shown in Fig. 1, and disposed adjacent to the opposite end of the cable is a ring 22, it being apparent that each of the cables is provided with a ring, and the rings are received by hook brackets 23 arranged in convenient reach of the driver of the vehicle. The said opposite ends of the cables are fixed to suitable anchoring means 24, as clearly shown in Fig. 1. The cables are passed through a suitable opening or openings arranged in the floor board of the vehicle and when the rings are received by the hook brackets, the jacks are held in a raised position, but when the rings are removed from the hook brackets the jacks drop by gravity, as will be apparent upon inspection of Figs. 1 and 3.

I also employ a chock which, as best shown in Fig. 5, is in fact a block of wood or other material, and includes a body 25 having a serrated lower surface to provide ground engaging teeth 26. The upper surface of the block is inclined or beveled as at 27 in order to form a runway for the tire as indicated in dotted lines in Fig. 3.

The chock co-operates with the jack in elevating a wheel of the vehicle, and while the elevating operation may be obvious it may be briefly described as follows:

It is well known that the general use of a jack is to change tires, after the latter have become deflated by puncture or the like, and I have illustrated in Fig. 3 the manner of using my jack in elevating a wheel with a deflated tire. The jack is first dropped to the dotted line position by removing the ring of the cable from the hook bracket. The chock is placed with the inclined or beveled portion facing the tire. The vehicle is moved rearwardly to cause the tire to ride up the inclined portion and as the base of the jack will grip the ground, the movement of the vehicle will naturally cause the jack to be arranged from its dotted line position of Fig. 3 to the full line position thereof and, therefore, elevate the wheel. The movement of the vehicle will leave the chock in the dotted line position on the right of Fig. 3, so that it can be readily removed after the wheel has been elevated. When the deflated tire has been removed and an inflated tire replaced, the vehicle is again moved under its power for disposing the jack to a position whereby it can be lifted through the instrumentality of its cable.

From the above description and disclosure of the drawing it will be obvious that I have provided an elevating device in the form of a jack for each wheel of the vehicle, so that in the event the tire on any one of the wheels becomes deflated the wheel can be easily and expeditiously elevated for changing the tire, or for the purpose of performing any work whatsoever thereon, as well as upon the wheels. It will be further noted that the jacks are identical and can be interchanged with respect to the hanger brackets, and as the sections of the jacks are adjustable with respect to each other my elevating device can be used on all makes and types of motor vehicles regardless of the wheel base and height of the axles with respect to the ground.

It is thought from the foregoing description that the advantages and novel features of my invention will be readily apparent.

I desire it to be understood that I may make changes in the construction and in the combination and arrangement of the several parts, provided that such changes fall within the scope of the appended claims.

I claim:

1. In an automobile jack operatively connected with an axle structure of the vehicle, a clamp for pivotally connecting the jack with the axle structure, said clamp comprising an upper part shaped to fit over a portion of the axle structure and having two openings, a lower part shaped to fit the axle structure on the side opposite the upper part and having a plurality of grooves, two of said grooves being aligned with said openings, and a U-bolt for clamping said upper and lower parts upon the axle structure, said U-bolt lying in said grooves and extending through said openings for the reception of nuts, the bight of the U-bolt lying within one of said grooves, said lower part having an opening lying within the U-bolt for receiving a pivot carried by the jack.

2. An automobile jack comprising a supporting standard having a pivot, a clamp for pivotally connecting the jack with an axle structure of the vehicle, said clamp comprising an upper part having a pair of openings, a lower part having grooves aligned with said openings, and a U-bolt lying in said grooves and extending through said opening for the reception of nuts, to clamp the upper and lower parts to the axle structure, said lower part being provided with an opening lying within the U-bolt for receiving the pivot carried by said standard.

3. In combination with the axle structure of a motor vehicle, a jack having a pivot, a two-piece clamp for connecting the jack with the axle structure, and a U-bolt passing around said clamp for connecting the two pieces as a unit with the axle structure, one of said pieces having an opening for receiving said pivot, said opening lying within said U-bolt.

SALVATORE G. NUCCIO.